US008156549B2

(12) United States Patent
Rice et al.

(10) Patent No.: US 8,156,549 B2
(45) Date of Patent: *Apr. 10, 2012

(54) DEVICE INDEPENDENT AUTHENTICATION SYSTEM AND METHOD

(75) Inventors: Mike Rice, Glendale, AZ (US); Sineesh Keshav, Peoria, AZ (US)

(73) Assignee: American Express Travel Related Services Company, Inc., New York, NY (US)

(*) Notice: Subject to any disclaimer, the term of this patent is extended or adjusted under 35 U.S.C. 154(b) by 590 days.

This patent is subject to a terminal disclaimer.

(21) Appl. No.: 11/741,867

(22) Filed: Apr. 30, 2007

(65) Prior Publication Data

US 2007/0204044 A1 Aug. 30, 2007

Related U.S. Application Data

(63) Continuation of application No. 10/314,736, filed on Dec. 9, 2002, now Pat. No. 7,222,363.

(60) Provisional application No. 60/419,363, filed on Oct. 18, 2002.

(51) Int. Cl.
*H04L 29/06* (2006.01)

(52) U.S. Cl. .......................................... 726/9

(58) Field of Classification Search .......... 380/247–250, 380/278; 713/155, 159, 172, 185; 726/4–5, 726/9–10
See application file for complete search history.

(56) References Cited

U.S. PATENT DOCUMENTS

| | | | |
|---|---|---|---|
| 5,454,038 A | 9/1995 | Cordery et al. | |
| 5,907,621 A * | 5/1999 | Bachman et al. | 713/155 |
| 6,092,196 A * | 7/2000 | Reiche | 726/6 |
| 6,119,167 A | 9/2000 | Boyle et al. | |
| 6,205,480 B1 * | 3/2001 | Broadhurst et al. | 709/225 |
| 6,223,287 B1 | 4/2001 | Douglas et al. | |
| 6,226,752 B1 * | 5/2001 | Gupta et al. | 726/9 |
| 6,226,788 B1 * | 5/2001 | Schoening et al. | 717/107 |
| 6,233,577 B1 | 5/2001 | Ramasubramani et al. | |
| 6,374,359 B1 * | 4/2002 | Shrader et al. | 726/5 |
| 6,385,652 B1 | 5/2002 | Brown et al. | |
| 6,510,236 B1 * | 1/2003 | Crane et al. | 382/116 |
| 6,629,591 B1 | 10/2003 | Griswold et al. | |
| 6,643,783 B2 | 11/2003 | Flyntz | |
| 6,701,438 B1 * | 3/2004 | Prabandham et al. | 726/11 |
| 6,834,341 B1 | 12/2004 | Bahl et al. | |
| 6,950,987 B1 | 9/2005 | Hargraves et al. | |
| 7,188,183 B1 * | 3/2007 | Paul et al. | 709/229 |

(Continued)

OTHER PUBLICATIONS

RFC 2616, Hypertext Transfer Protocol—HTTP/1.1, Section 14, Fielding, et al., Jun. 1999.*

(Continued)

*Primary Examiner* — Gilberto Barron, Jr.
*Assistant Examiner* — Shaun Gregory
(74) *Attorney, Agent, or Firm* — Snell & Wilmer L.L.P.

(57) ABSTRACT

A system is disclosed which facilitates authentication processes with web-enabled wireless devices, including those that do not support the use of cookie files. To facilitate such authentication, a web server analyzes an HTTP request file from a communication device for the presence of security token data. Where none is found, a client is directed to a login page for input of authentication data, such as a user name and password information. Upon proper authentication, the client's communication device is issued a security token using standard HTML-INPUT tags. Thereafter, the web server determines if each additional HTTP request file received from the client includes a security token before responding to the request.

14 Claims, 2 Drawing Sheets

U.S. PATENT DOCUMENTS

| | | | | |
|---|---|---|---|---|
| 2002/0103933 | A1* | 8/2002 | Garon et al. | 709/246 |
| 2002/0143750 | A1* | 10/2002 | Brunssen et al. | 707/3 |
| 2003/0028792 | A1* | 2/2003 | Plow et al. | 713/193 |
| 2003/0069923 | A1* | 4/2003 | Peart | 709/203 |

OTHER PUBLICATIONS

HTML 4.01 Specifcation, W3C Recommendation Dec. 24, 1999.*

* cited by examiner

DEVICE INDEPENDENT AUTHENTICATION SYSTEM AND METHOD

CROSS REFERENCE TO RELATED APPLICATIONS

This application is a continuation of and claims priority to and the benefit of U.S. Non-Provisional application Ser. No. 10/314,736, filed on Dec. 9, 2002, entitled "Device Independent Authentication System and Method", which application claims priority to, and the benefit of, U.S. Provisional Application Ser. No. 60/419,363, filed Oct. 18, 2002, all of which are incorporated herein by reference.

TECHNICAL FIELD

The present invention generally relates to wireless internet communications, and more particularly, to systems and methods for initiating secure sessions with web-browsing enabled wireless devices that do not support cookies.

BACKGROUND INFORMATION

The term "cookie" generally refers to a text-based file generated by a web server and stored on a client's computer for later retrieval when, for example, the client enters a website. A cookie file generally facilitates client navigation within a web site and enable web sites to gather information about users entering the site.

In particular, the cookie file is typically a named piece of data that a web server sends to the client computer, which instructs the client computer to store and send the cookie back to the server each time the client computer transmits a request to that server. The information contained in a cookie file often comprises at least a client ID, which includes a unique number in the form of a name-value pair which assigned to a client upon accessing the web site. The client ID generally includes a name-value pair. For example, a client visiting the website www.goto.com, might receive a cookie file on the client's computer containing a single client ID in the form of a name-value pair as follows:

clientID A9A3BECE0563982D www.goto.com/

Other web sites might store additional information in a cookie file, such as, for example, the cookie generated by www.amazon.com, namely:

session-id-time 954242000 amazon.com/
session-id 002-4135256-7625846 amazon.com/
x-main eKQIfwnxuF7qtmX52x6VWAXh@Ih6Uo5H amazon.com/
ubid-main 077-9263437-9645324 amazon.com/

In this example, the information in the cookie file includes a main client ID, an ID for each session, and the time the session began on the client's computer. Cookie data may also contain additional information such as path data, client preference data, geographic information, and/or the like.

Most cookies are also time-sensitive, meaning the cookie is often associated with an expiration date, after which the client computer no longer sends the cookie to the associated server and the client computer removes the cookie from its internal database. Generally, these cookies are classified into two groups, namely a "session-only" cookie which expires automatically when the browser shuts down, and a "persistent" cookie which generally expires at a date and time set by the server.

Web servers may also use cookies to initiate secure sessions. In a secure session transaction, a client visiting a secure web site for the first time is typically queried for client ID and password information. After the client provides the requested information, the information is then compared against a database associated with the server for authentication. Upon valid authentication, a security token is then typically issued to the client. Issuing a security token usually occurs by sending to the client's browser a cookie file with the security token information contained therein. A copy of this cookie information is then sent back to the web server that issued the cookie upon each new web page acquisition, or "click-through," request made by the client within that particular web site. During the secure session, the cookie file is generally configured to expire when the client terminates the browser session, either by logging out of the web site or by closing out the browser.

The server can also utilize the cookie information for session tracking purposes. Sessions often include grouping individual and seemingly unrelated HTTP requests together to identify a particular client's session, as if the requests came across a single persistent connection between the server and the client. Of course, such connections are not persistent, as HTTP is really a connect-and-release protocol wherein a client makes a connection to the server, sends a request, waits for a response, and then disconnects. This allows the server to service many more clients than would otherwise be possible if all the clients kept their connections open. However, it also means that a session may not be defined by a single persistent connection. Accordingly, many web sites track a user's session by accessing special information within a cookie file, such as a session ID, or even a security token, to maintain a database which logs the various cookie file submissions from a particular client within a given period of time to define a particular session.

Recently, there has been tremendous growth in the utilization of wireless devices, such as cell phones and personal data assistants (PDAs), with web-browsing capabilities. However, these devices usually pose significant challenges to web site operations, particularly in systems seeking to conduct secure sessions, session tracking, and other functionality typically associated with cookie files. Most wireless devices do not support the use of cookie files for various reasons, most notably is memory limitations on the wireless device. Cookie files tend to be very large, sometimes up to approximately 32 kb, and websites typically serve numerous cookie files within a single session. However, wireless devices typically do not have sufficient memory to handle these types of files, making such memory intensive interfaces problematic.

Various methods have been attempted to circumvent this problem. One method requests device-specific information associated with a wireless or handheld device and maps this device information onto a proxy database associated with a server for that device. For example, this information may be mapped onto a gateway between a client and the device. However, protocols for obtaining such information is often device specific such that a server is not always able to determine how to obtain this type of information from a particular device. Moreover, such methods often leave artifacts of device-specific information on third-party servers that are susceptible to cloning. Finally, some gateways do not store all types of cookies files. For example, some gateways permit the storage of only persistent cookie files, while excluding session cookies.

Another method, commonly referred to as "URL rewriting," essentially encodes the necessary information onto a URL generated by the server. For example, where a server would normally return a standard URL as follows:

www48. americanexpress.com/en/intl?request_type= wl_CardsListHandler&Face=ja_JP_IMODE a URL rewriting enabled server might return the following URL instead:

www48.americanexpress.com/en/intl?request_
type=wl_CardsListHandler&Face=ja_JP_IMODE&
sessionid=f0bd52f63fbbf8b3dfdd3abb65e04c1e In accordance with this method, information that would normally be stored in a cookie is added to the URL string instead. When a request is received from the client, the server looks for this special session information in lieu of a cookie. Here, however, the length of such URL strings tend to become very long, and often surpasses the management capability of many wireless devices. For example, many wireless devices enable a URL capacity of approximately 100 characters or less, whereas many enhanced URL strings may comprise 100 characters or more.

In a related method, secure links are established using URLs where server communication with a client is conducted using secure socket layers (SSL). In this example, the SSL would be placed between the gateway and the server. In another example, unique identification data or session data may be added in a header of an HTTP request. However, this approach is also problematic in that client ID and password data are typically inputted through a Popup logon box, and many wireless devices are not compatible with this type interface.

Accordingly, systems and methods are therefore needed in order to overcome these and other limitations of the prior art.

BRIEF SUMMARY OF THE INVENTION

In accordance with exemplary embodiments of the present invention, and as discussed in greater detail below, systems and methods are provided to facilitate authentication and session tracking processes with web-enabled wireless devices, including those that do not support the use of cookie files. In accordance with an exemplary embodiment, a host web server analyzes an HTTP request file received from a communication device for the presence of security token data. Where none is found, a client is directed to a login page for the input of authentication data, such as a user name and password information. Upon proper authentication, the client's communication device is issued a security token using standard HTML-INPUT tags by the host web server. Thereafter, the host web server determines if each additional HTTP request file received from the client includes a security token before responding to the request. The security token obtained from the web server may be stored on a communication device, in encrypted form, utilizing standard HTML-INPUT tags. In additional embodiments, additional validation processes are provided, such as analyzing device identifying information, including URL information, client browser information, and client agent identification information associated with the HTTP requests.

BRIEF DESCRIPTION OF THE DRAWINGS

The subject invention will hereinafter be described in conjunction with the appended drawing figures, wherein like numerals denote like elements, and.

DETAILED DESCRIPTION OF EXEMPLARY EMBODIMENTS

The present invention is described herein in terms of functional block components and various processing steps. It should be appreciated that such functional blocks may be realized by any number of hardware and/or software components configured to perform the specified functions. For example, the present invention may employ various integrated circuit components, e.g., memory elements, digital signal processing elements, look-up tables, and the like, which may carry out a variety of functions under the control of one or more microprocessors or other control devices. In addition, those skilled in the art will appreciate that the present invention may be practiced in any number of data communication contexts and that the various systems described herein are merely exemplary applications for various aspects of the invention. General techniques that are known to those skilled in the art are not described in detail herein.

The present invention facilitates a web server sending a security token to a wireless device. The invention also stores the security token on a wireless device in encrypted form. In one embodiment, the system facilitates storing the security token on the wireless device in encrypted form utilizing standard HTML-INPUT tags. The HTML-INPUT tags may also initiate a secure session with a web server application.

Figure 1:
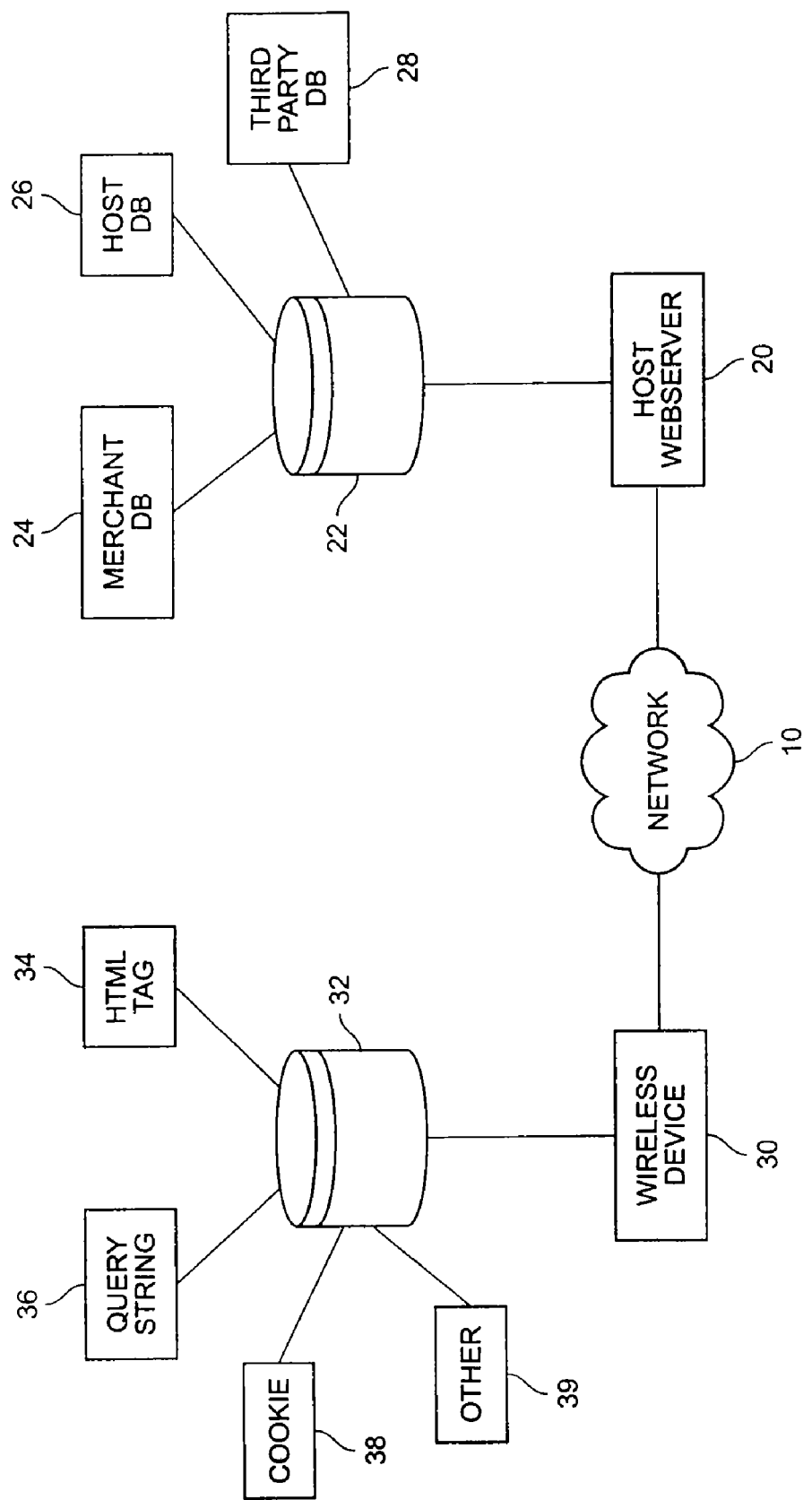
FIG. 1 is a schematic illustration an overview of an exemplary system of the present invention.

With reference to an exemplary system shown in FIG. 1, a wireless device 30 is provided, for interaction with a host web server 20 over a communications network 10. In accordance with the invention, the wireless device 30 may include any suitable device, such as a kiosk, personal digital assistant, handheld computer (e.g., Palm Pilot®), personal computer, cellular phone, CB-radio, walkie-talkie, or any other suitable communication device. A memory 32 may be associated with the wireless device 30. In accordance with various aspects and embodiments of the invention, the memory 32 is suitably configured to store HTML tags 34, query strings 36, cookie files 38, and/or other appropriate information 39 to facilitate client identification to a host web server 20. Communications between the wireless device 30 and the host web server 20 may be accomplished through any suitable communication network 10, such as, for example, a telephone network, cellular network, satellite network, Intranet, Internet, online communications, off-line communications, wireless communications, transponder communications and/or the like. The host web server 20 may be include a web application server, host server and/or any other suitable hardware or software for facilitating communication with a wireless device over a network. The web server 20 includes a memory 22 for storing digital data, and at least one associated database, and preferably a plurality of databases, including a merchant database 24, host database 26, and/or other third party databases 28 where appropriate. As explained in greater detail below, the merchant database 24 includes client identification data for use in various authentication processes in accordance with the various aspects and embodiments of the present invention.

Figure 2:
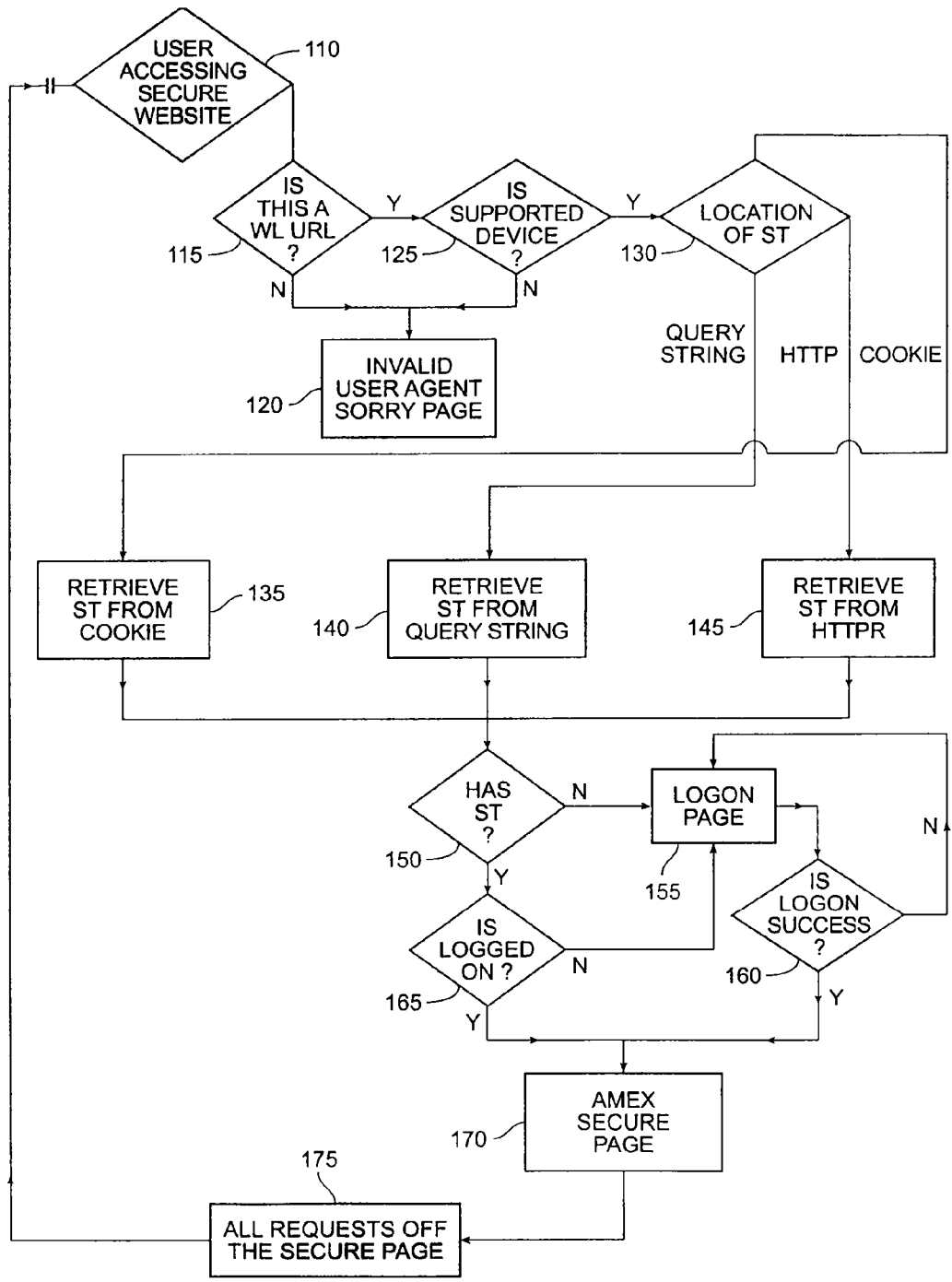
FIG. 2 is a flowchart depicting an exemplary method for initiating a secure session with a web site using either cookies, query strings, or HTML tags containing embedded security tokens.

In an exemplary embodiment of a method of the present invention, and referring to FIG. 2, a client computer facilitates access to a web site to conduct a secure session (Step 110) by transmitting an appropriate URL through a browser associated with the client's computer. In accordance with an exemplary embodiment, the browser communication proceeds via standard HTTP protocols. However, practitioners will appreciate that any other suitable protocol might also be used, such as, for example, WAP (wireless application protocol) and HDAP (handheld device application protocol). The client browser then forms a connection with a web server associated with the desired web site at an appropriate IP address. Following standard protocol, the initial HTTP request sent by the browser contains various data, including a header that instructs the server to send back an appropriate response, such as, for example, a GET request or a POST request.

In accordance with the present invention, the web server may utilize this initial data to undertake some early validation processes (Step 115). For example, the URL transmitted to the server by the client may itself contain information related to the type of communication device. In this example, the web server may receive either a standard URL associated with a PC-based device, or a wireless-associated URL associated with a wireless or hand-held based device. For example, a PC-based URL might be transmitted as follows:

www48.americanexpress.com/en/
cards?request_type=intl_CardsListHandler&Face=ja_JP, whereas a wireless-associated URL might be transmitted as follows:

www48.americanexpress.com/en/
cards?request_type=wl_CardsListHandler&Face=ja_JP_IMODE.

The web server may grant or deny access based upon this information, such as, for example, excluding PC-based URLs from accessing a wireless web access site. In the above URL strings, "type=intl" may designate a web site interface for PC-based devices, whereas "type=wl" may designate a web site interface for wireless-based devices. In some embodiments, the PC-based URL would access a PC-based web site, and the wireless-based URL would access a wireless web site, such as, for example, a simplified text-only version of the PC-based site. In other embodiments, a PC-based device could access the wireless web site through a wireless-based URL. In this embodiment, as described in greater detail below, the web server may access additional PC-based identification data, such as browser identification data, to further restrict and/or selectively grant access to the web site, such as permitting standard operational access to the site and/or additionally permitting selective administration access to the site.

The web server also receives various types of identification data associated with the client's browser. Typically, this information is transmitted by the client in a request header, under standard HTTP protocols. In accordance with the invention, this identification information may identify the client's agent, such as the client's wireless communication service provider. The web server may conduct an additional or alternative validation step according to this browser-based information. In one embodiment, the web server compares such client agent data against client agents identified in an associated database to determine if web access should be granted (Step 125). For example, with momentary reference to FIG. 1, this database may be a merchant database 24 containing a list of user agent identification data for mobile phones and other wireless devices associated with a particular wireless services provider, such as, for example, VERIZON WIRELESS. For example, VERIZON WIRELESS may provide the host with a list of client agent IDs associated with certain mobile phones authorized for use on its system, such as, for example, certain model phones produced by cell phone manufacturers NOKIA and MOTOROLA. Alternatively, other appropriate databases associated with the host 26 or other third parties 28 may also be used in association with this aspect of the invention.

In a further embodiment, the database is configurable as a permissive database, specifically identifying clients with permission to enter the web site, or exclusive, identifying clients who may not enter the web site. For example, the database may identify clients associated with some wireless service providers as permissible, such as VERIZON WIRELESS, and identify others as impermissible or unauthorized to access the website, such as SPRINT PCS customers. In other embodiments, the web server may receive phone-specific data and compare that information to a similar permissive and/or exclusive database based on specific phone types. For example, the database may identify clients of NOKIA phones as permissible, but clients of QUALCOM phones as impennissible or unauthorized.

In accordance with the present invention, the system may be variously configurable to allow web access based on wireless-specific URL data, browser specific identification data, and/or any other appropriate data that identifies or links a client to specific and/or general classification information which then may be compared against a database for authentication purposes. For example, the system may allow a client with PC-based URL transmission access to the web site, with or without subjecting the client to an additional validation step, such as analysis of browser identification data discussed above. In a further embodiment, the system might also be configured to allow PC-based clients operational access to the web site, such as, for example, by subjecting the PC user to additional validation steps (not shown). Clients failing to receive permission according to either a URL validation step, or a client identification validation step, or any other appropriate validation step, may be transmitted an error signal and/or message, such as, for example, a "sorry, access denied page" (Step 120).

In a further embodiment, initiation of a secure session may proceed by the web server facilitating the determination of the location of the security token according to configuration data associated with the client device (Step 130). For example, the web server determines whether the device stores security tokens in cookie files, query strings, and/or header information wherein the header information may be contained in HTTP requests, secure links, and/or HTML tags. In accordance with a further embodiment, such security token location information may be based upon client agent ID information. For example, wireless devices may have unique client ID data specific to its associated web browser such that such identification information may then be compared to a lookup table within a database associated with the web server to determine the appropriate location of the security token. In some embodiments, this location information is provided by a merchant, such as a wireless service provider, specifically identifying which wireless devices support cookie files, query strings, etc. The web server then attempts to retrieve the security token from the appropriate location. For example, where the client device is configured to store security tokens in an HTML tag, the web server attempts to retrieve the appropriate text in an HTTP request file (Step 145), such as, for example in the body of a POST request. In an exemplary embodiment, wherein the security token is stored in an HTML tag, the security token information may appear as follows:

<INPUTTYPE="hidden"NAME="mktt"Value=E0F0E1F7E4F398654A2428">

In some applications, a particular device, such as a PC-based device, may be configured to support more than one type of security token, such as, for example, receipt of a security token in either a cookie file or an HTML tag. In accordance with the present invention, the web server may be variably configured to query various locations in association with this retrieval step. For example, the web server may attempt to retrieve the security token data from an HTML tag first, and in the event the security token is not found, attempt to retrieve the information from a regular cookie file second. Likewise, where the client's device is configured to store security tokens in a cookie file and/or query string, the web server attempts to retrieve the appropriate text in the like file, such as a cookie file (Step 135) or a query string (Step 140) respectively.

In one embodiment, the server application determines whether the retrieval step was successful, such as whether it successfully retrieved security token data (Step 150). When security token data is not received, the client is re-directed to a log-on page (Step 155). A log-on page, or other log-on interface, such as a pop-up screen, may proceed under any appropriate standard method now known or hereafter devised. For example, in one embodiment, the client must establish a user name and password prior to interfacing with the system. Such user name and password may be established prior to accessing the site with the assistance of a live phone operator or by directly inputting such information into an associated web site. In accordance with this exemplary embodiment, the client would be asked for appropriate validation information, such as, for example, the client's account and billing information, address, and/or social security number, prior to establishing a user name and password.

When log-on is successful, the client is issued an appropriate security token by the web server and thereafter, a secure session is initiated wherein the client is directed to a secure page within the web site (Step 170). In a further embodiment, even where the server properly detects a security token, the corresponding data is interrogated to determine if the security token is valid by comparing the information to appropriate corresponding information on database associated with the server (Step 165). For example, the security token may be configured with time related information, such as an expiration date, wherein the security token may "time out," such that it is no longer valid after a certain duration of time. Where the security token fails to have identical correspondence, or where the security token is no longer valid, such as, for example where it has expired, or "timed-out," the client is similarly pointed to the log-on step (Step 155). When the log-on event is successful, either at Step 160 or Step 165, the secure session is enabled, and the client is directed to the appropriate secure page, content, and/or data, within the web site (Step 170). In accordance with a further aspect of the invention, all subsequent requests requiring a secure session from the secure session page (Step 175) will proceed under similar retrieval and validation processes as described above.

In accordance with an exemplary embodiment, security token generation, storage, and retrieval proceeds using 128 bit, HTTP SSL (secure socket layer), public key encryption technology. In accordance with further embodiments, standard HTTP protocol and HTML markup language is used. Of course, other well-known methods may be used as well, including other known protocols, such as WAP, HDAP, and UDP, as well as other markup languages including CHTML (compressed HTML) and XML.

As such, the present invention improves the web security for wireless devices. Moreover, the invention, reduces manual intervention, reduces costs per transaction, maintains equity with market competitors in mobile servicing, provides a gateway for mobile point service and payment services, such as via J-Sky, and provides a new and appealing service channel. Furthermore, merchants may utilize this mobile network as their marketing channel to CMs/J-Sky clients or to provide a gateway for mobile coupon service via J-Sky. For clients, the system extends the market's ability to allow self-service for account inquiry and it enhances customer loyalty from, for example, increased spending and increased account retention.

While the exemplary embodiments disclosed herein are described in sufficient detail to enable those skilled in the art to practice the invention, it should be understood that other embodiments may be realized and that logical and mechanical changes may be made without departing from the spirit and scope of the invention. Thus, the following detailed description is presented for purposes of illustration only and not of limitation. For example, the steps recited in any of the method or process descriptions may be executed in any order and are not limited to the order presented.

For the sake of brevity, conventional data networking, application development and other functional aspects of the systems (and components of the individual operating components of the systems) may not be described in detail herein. It should be noted that many alternative or additional functional relationships or physical connections may be present in a practical electronic transaction system.

The system may include a web application server, host server or other computing systems including a processor for processing digital data, a memory coupled to said processor for storing digital data, an input digitizer coupled to the processor for inputting digital data, an application program stored in said memory and accessible by said processor for directing processing of digital data by said processor, a display coupled to the processor and memory for displaying information derived from digital data processed by said processor and a plurality of databases, said databases including client data, merchant data or other third party data, such as financial institution data and/or like data that could be used in association with the present invention. As those skilled in the art will appreciate, client computer will typically include an operating system (e.g., Windows NT, 95/98/2000, Linux, Solaris, Palm OS, etc.) as well as various conventional support software and drivers typically associated with computers. Client computer can be in a home or business environment with access to a network. In an exemplary embodiment, access is through the Internet through a commercially-available web-browser software package.

Certain communications between the parties to the transaction and the system of the present invention may be accomplished through any suitable communication means, such as, for example, a telephone network, Intranet, Internet, point of interaction device (point of sale device, personal digital assistant, cellular phone, kiosk, etc.), online communications, off-line communications, wireless communications, transponder communications and/or the like. One skilled in the art will also appreciate that, for security reasons, any databases, systems, or components of the present invention may consist of any combination of databases or components at a single location or at multiple locations, wherein each database or system includes any of various suitable security features, such as firewalls, access codes, encryption, de-encryption, compression, decompression, and/or the like.

Certain databases in the system may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. A database may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is similar in certain embodiments. However, data tables having similar, though not identical, data in the key fields may also be merged by using AGREP, for example.

Certain computers may provide a suitable website or other Internet-based graphical client interface which is accessible by clients. In one embodiment, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access or SQL Server, Oracle, Sybase, Informix MySQL, Intervase, etc., may be used to provide an ADO-compliant database management system. The term "webpage" as it is used herein is not meant to limit the type of documents and applications that might be used to interact with the client. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and the like.

The present invention may be described herein in terms of functional block components, screen shots, optional selections and various processing steps. It should be appreciated that such functional descriptions may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography & Network Security: Principles & Practice" by William Stalling, published by Prentice Hall; all of which are hereby incorporated by reference.

It will be appreciated, that many applications of the present invention could be formulated. One skilled in the art will appreciate that the network may include any system for exchanging data or transacting business, such as the Internet, an intranet, an extranet, WAN, LAN, satellite communications, and/or the like. It is noted that the network may be implemented as other types of networks, such as an interactive television (ITV) network. The clients may interact with the system via any input device such as a keyboard, mouse, kiosk, personal digital assistant, handheld computer (e.g., Palm Pilot®), cellular phone or other wireless device, and/or the like. Similarly, the invention could be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols. Moreover, the system contemplates the use, sale or distribution of any goods, services or information over any network having similar functionality described herein.

The computing units may be connected with each other via a data communication network 10. The communications network 10 may be a public network and assumed to be insecure and open to eavesdroppers. In the illustrated implementation, the communications network 10 may be embodied as the internet. In this context, the computers may or may not be connected to the internet at all times. For instance, the customer computer may employ a modem to occasionally connect to the internet, whereas the bank computing center might maintain a permanent connection to the internet. Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997). LOSHIN, TCP/IP CLEARLY EXPLAINED (1997). All of these texts are hereby incorporated by reference.

The systems may be suitably coupled to network via data links. A variety of conventional communications media and protocols may be used for data links. Such as, for example, a connection to an Internet Service Provider (ISP) over the local loop as is typically used in connection with standard modem communication, cable modem, Dish networks, ISDN, Digital Subscriber Line (DSL), or various wireless communication methods. Merchant system might also reside within a local area network (LAN) which interfaces to network via a leased line (T1, D3, etc.). Such communication methods are well known in the art, and are covered in a variety of standard texts. See, e.g., GILBERT HELD, UNDERSTANDING DATA COMMUNICATIONS (1996), hereby incorporated by reference.

Each participant may be equipped with a computing system to facilitate online commerce transactions. The customer has a computing unit in the form of a personal computer, although other types of computing units may be used including laptops, notebooks, hand held computers, set-top boxes, and the like. The merchant has a computing unit implemented in the form of a computer-server, although other implementations are possible. The bank has a computing center shown as a main frame computer. However, the bank computing center may be implemented in other forms, such as a minicomputer, a PC server, a network set of computers, and the like.

The merchant computer and a bank computer may be interconnected via a second network, referred to as a payment network. The payment network represents existing proprietary networks that presently accommodate transactions for credit cards, debit cards, and other types of financial/banking cards. The payment network is a closed network that is assumed to be secure from eavesdroppers. Examples of the payment network include the American Express®, VisaNet® and the Veriphone® network. The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the invention. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

We claim:

1. A method including:
   receiving, by a computer based system for initiating a secure communication session, a http request file and browser identification data;
   analyzing, by the computer based system, the browser identification data to selectively grant access to proceed based upon a determination that a device sending the http request file is a supported type of device, wherein an error message is transmitted to the device sending the http request file in response to the device not being a supported device, and wherein access to proceed is not established in response to the device not being a supported device;
   analyzing, by the computer based system, the HTTP request file for presence of a security token, wherein the http request file includes the client agent data and the communication device model data;
   at least one of, by the computer based system, comparing the client agent data to authorized client agents, or comparing the communication device model data to authorized communication device models on an associated database;
   based on the comparing, at least one of: configure, grant, or deny access to the host web server;
   transmitting, by the computer based system and in response to a determination of no security token being present in the HTTP request file, an encrypted security token in a reply communication within an HTML INPUT tag; and
   receiving, by the computer based system, a request to initiate a secure session including the encrypted security token.

2. The method of claim 1, further including receiving authentication credentials, by the computer based system, over a secure communication channel.

3. The method of claim 1, further including receiving authentication credentials, by the computer based system, over a secure communication channel and transmitting the security token in response to authentication credentials having been authenticated.

4. The method of claim 1, wherein a communication device associated with at least one of the client agent data and the communication device model data is at least one of a wireless device or a PC-based device.

5. The method of claim 1, further including receiving, by the computer based system, URL information identifying a type of a communication device issuing the request.

6. The method of claim 1, further including receiving, by the computer based system, device-specific browser information identifying a type of communication device issuing the request.

7. The method of claim 1, further including:
   issuing, by the computer based system, a login page in response to the determination of no security token being present in the HTTP request file, wherein the login page requests input of at least one of a user name or a password;
   validating, by the computer based system, the user name or the password; and
   issuing the security token in response to the successful validating.

8. The method of claim 1, wherein the security token facilitates at least one of: establishing a secure session with a web server or tracking a particular web session within a web site.

9. A method including:
   transmitting, by a communication device, a http request file and browser identification data, wherein the http request file includes the client agent data and the communication device model data, wherein the request is transmitted to a host web server, wherein access to proceed is granted based upon a determination that the communication device is a supported type of device, wherein an error message is received by the communication device in response to the communication device not being a supported device, and wherein access to proceed is not established in response to the device not being a supported device;
   at least one of, by the communication device, comparing the client agent data to authorized client agents, or comparing the communication device model data to authorized communication device models on an associated database;
   based on the comparing, at least one of: configure, grant, or deny access to the host web server; and
   receiving, by the communication device, over a secure communication channel, a security token within an HTML INPUT tag, wherein the host web server transmits the received HTML INPUT tag, wherein the host web server does not detect the security token in the http request file.

10. The method of claim 9, further including:
    transmitting authentication credentials, by the communication device, wherein the authentication credentials are transmitted to the host web server over the secure communication channel.

11. The method of claim 9, further including:
    transmitting authentication credentials, by the communication device, wherein the authentication credentials are transmitted to the host web server over the secure communication channel; and
    receiving the security token, wherein the security token is transmitted from the host web server in response to the authentication credentials from the communications device having been authenticated by the host web server.

12. The method of claim 9, further including:
    receiving an authentication request, by the communication device, wherein the authentication request is transmitted from the host web server in response to a determination of the security token not being present in the http request file.

13. The method of claim 12, wherein the authentication request is a HTTP request.

14. A system comprising:
    a tangible, non-transitory memory communicating with a processor for initiating a secure communication session,
    the tangible, non-transitory memory having instructions stored thereon that, in response to execution by the processor, cause the processor to perform operations comprising:
      receiving, by the processor, a HTTP request file and browser identification data;
      analyzing, by the processor, the browser identification data to selectively grant access to proceed based upon a determination that a device sending the http request file is a supported type of device, wherein an error message is transmitted to the device sending the http request file in response to the device not being a supported device, and wherein access to proceed is not established in response to the device not being a supported device;
      analyzing, by the processor, the HTTP request file for presence of a security token, wherein the http request file includes the client agent data and the communication device model data;
      at least one of, by the processor, comparing the client agent data to authorized client agents, or comparing the communication device model data to authorized communication device models on an associated database;
      based on the comparing, at least one of: configure, grant, or deny access to the host web server;
      transmitting, by the processor, in response to a determination of no security token being present, an encrypted security token in a reply communication within an HTML INPUT tag; and
      receiving, by the processor, a request to initiate a secure session including the encrypted security token.

* * * * *